United States Patent [19]

Kelley et al.

[11] Patent Number: 4,938,321

[45] Date of Patent: Jul. 3, 1990

[54] LIQUID COOLED BRAKE APPARATUS

[75] Inventors: Reginald D. Kelley, Simpsonville, S.C.; Jerry L. Yater, Fairfield, Ohio

[73] Assignee: Force Control Industries, Inc., Fairfield, Ohio

[21] Appl. No.: 382,917

[22] Filed: Jul. 21, 1989

[51] Int. Cl.$^5$ ..................... F16D 55/38; F16D 65/853
[52] U.S. Cl. ................................. 188/171; 188/71.6; 188/264 E; 188/264 P
[58] Field of Search ..................... 188/71.6, 72.3, 170, 188/171, 264 E, 264 F, 264 P, 264 CC; 192/113 B

[56] References Cited

U.S. PATENT DOCUMENTS

| | | | |
|---|---|---|---|
| 2,700,439 | 1/1955 | Hodgson | 188/171 |
| 3,171,515 | 3/1965 | Wolfe | 188/171 |
| 4,049,089 | 9/1977 | Rundle | 188/171 |
| 4,415,067 | 11/1983 | Cory | 188/71.5 |
| 4,821,847 | 4/1989 | Langdon et al. | 188/171 |

FOREIGN PATENT DOCUMENTS 207897 10/1966 Sweden ............................ 188/264 E

*Primary Examiner*—Duane A. Reger
*Attorney, Agent, or Firm*—Jacox & Meckstroth

[57] ABSTRACT

A tubular hub member receives a shaft and is surrounded by a housing formed by a base section coupled to a cup-shaped closure section. The hub member defines an inlet passage for circulating cooling oil and supports a set of brake discs which interfit between a set of brake plates supported by pins projecting inwardly from the base section. An annular thrust plate is supported by the base section for axial movement and carries a set of compression springs which urge the thrust plate for clamping the brake plates and discs against a pressure plate mounted within the closure section. An annular electrical coil and support body are mounted by screws and spacer sleeves within the closure section, and an annular armature plate is supported by the sleeves for axial movement adjacent the end wall of the closure section. A set of actuating pins extend axially between the armature and thrust plates through the coil body and pressure plate, and the armature plate cooperates with a portion of the closure section to define a variable oil recirculating passage. Axial movement of the armature plate displaces cooling oil into the inlet passage to provide a surge of cooling oil during braking. The pressure plate has passages which are aligned with recesses in the coil body for recirculating cooling oil when the brake unit is positioned with a vertical axis, and diametrically opposed rotatable members provide for manually releasing the brake unit and for automatic reset to inactive positions.

30 Claims, 2 Drawing Sheets

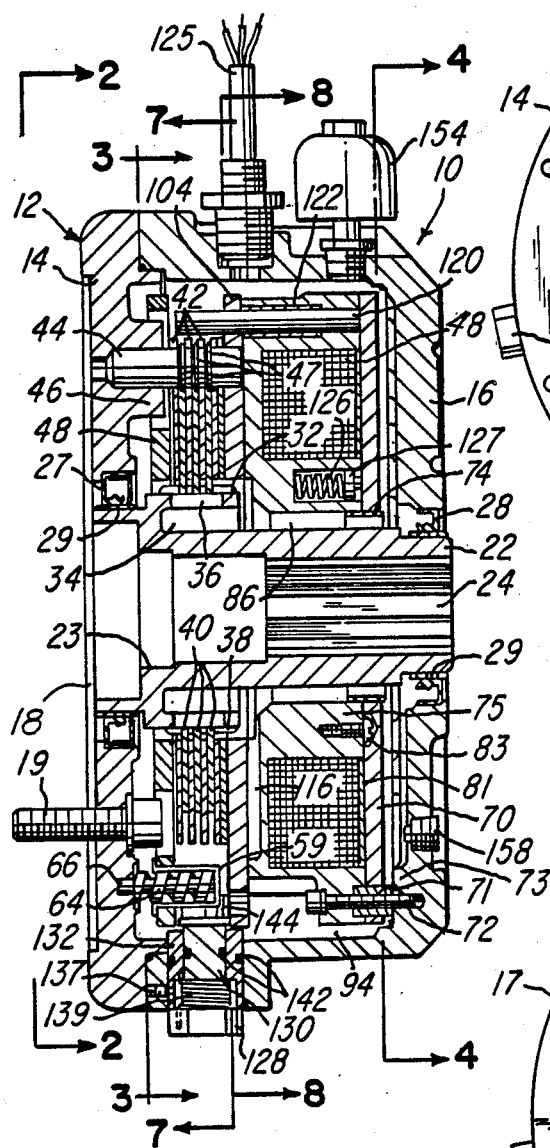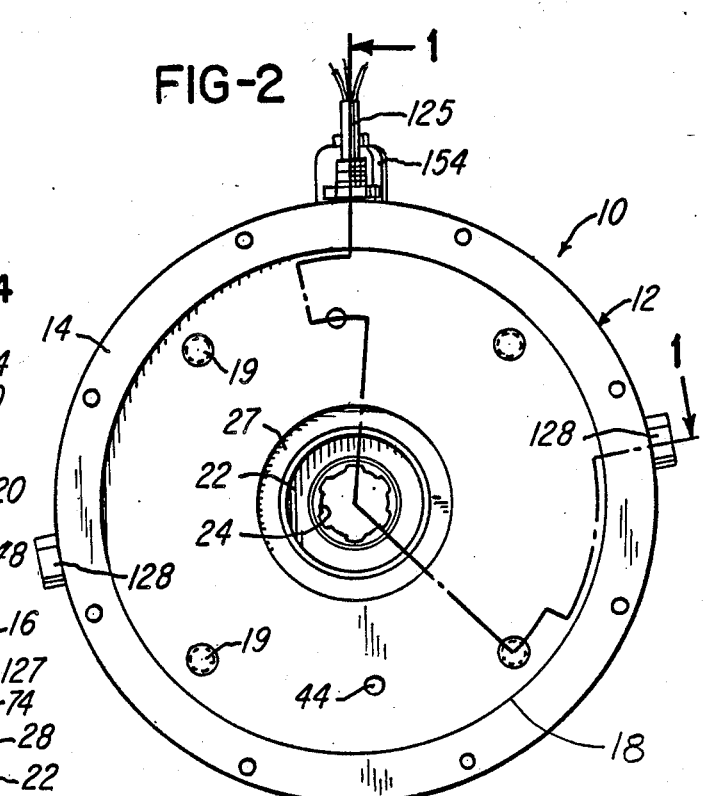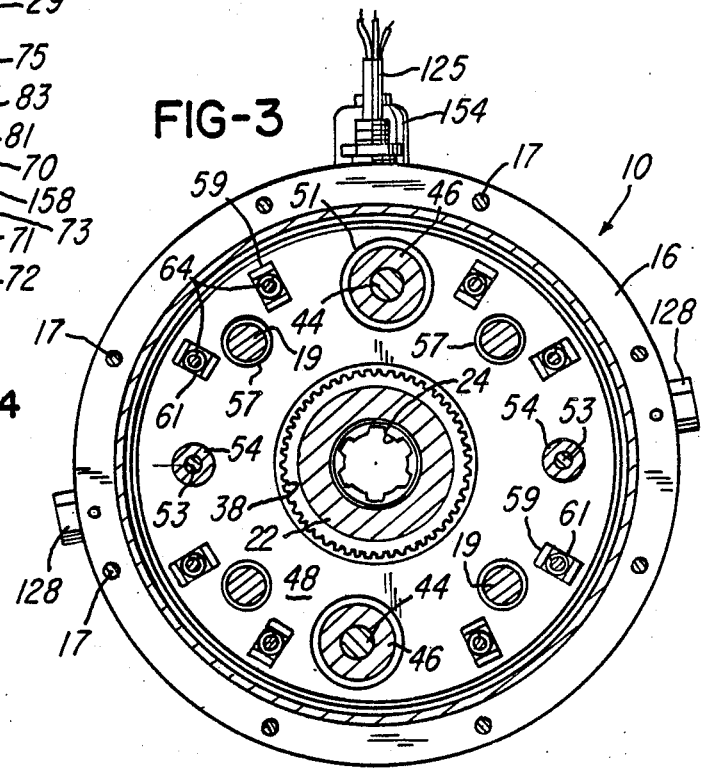

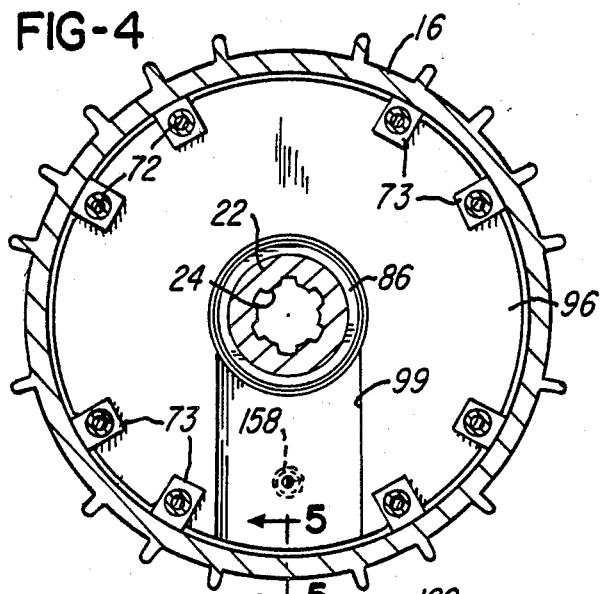
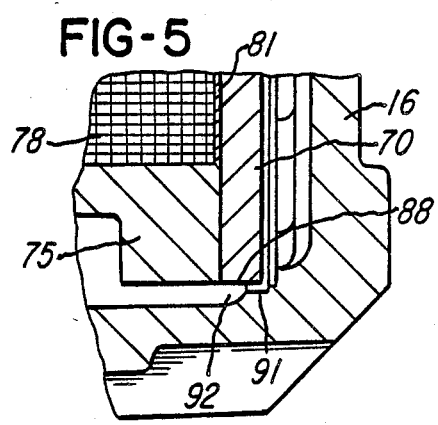
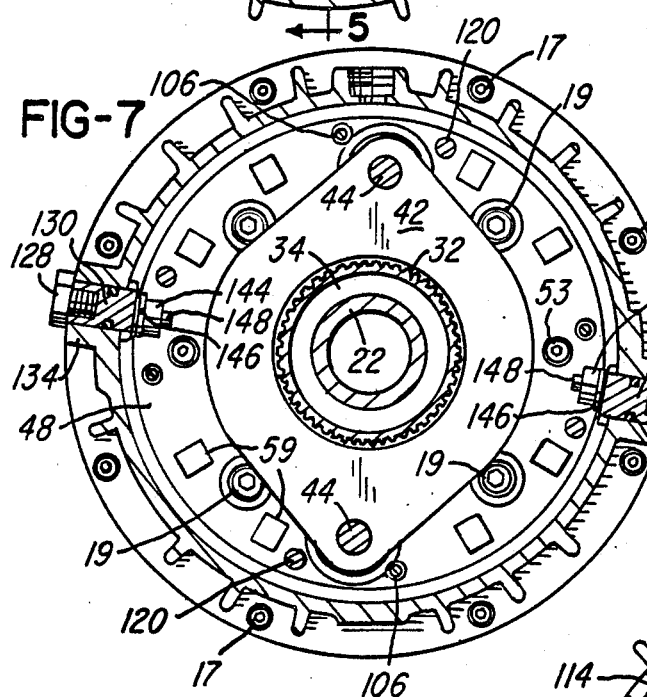
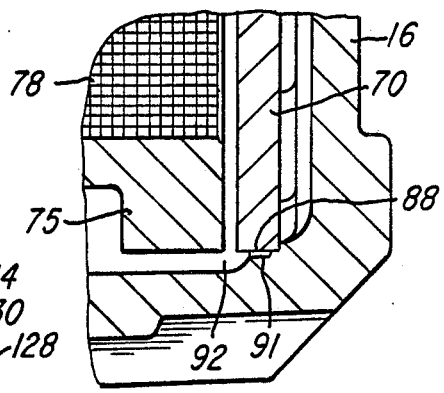
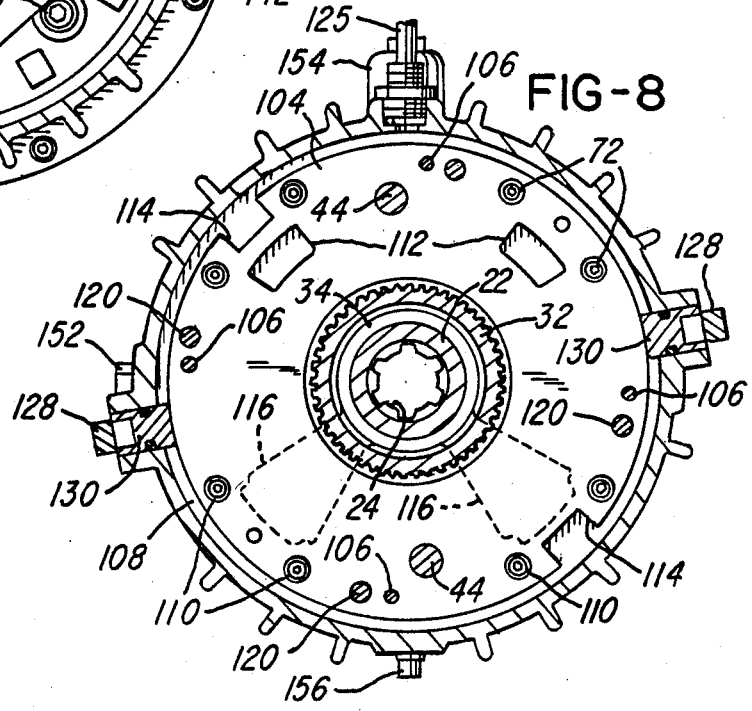

LIQUID COOLED BRAKE APPARATUS

BACKGROUND OF THE INVENTION

The liquid cooled brake unit or apparatus of the invention relates to the general type of brake apparatus or units disclosed in U.S. Pat. No. 4,415,067 and No. 4,821,947 which issued to the Assignee of the present invention and which are herein incorporated by reference. In such a brake unit, it is highly desirable to provide for recirculating cooling oil between the rotatable brake discs and the non-rotating brake plates, especially when the brake plates and discs are being clamped together for braking. The oil dissipates heat from the brake plates and discs and provides the brake unit with an extended operating life. It is also desirable to provide for automatically compensating for any wear of the brake plates and discs without requiring the brake unit to be opened and disassembled for adding shims. It has also been found desirable to construct the brake unit housing in two sections with each section providing for a sub-assembly in order to simplify manufacture of the brake unit and disassembly during servicing. While the braking operation is preferably performed by a set of compression springs, and the release of the brake is performed by a fluid actuated piston or an electrical coil, as shown in the above patents, it is also desirable to provide for manually releasing the brake unit to permit rotation of the shaft when the electrical power or air pressure is not being supplied. In addition, while the brake unit is normally operated with a horizontal axis, it is desirable to incorporate means which provide for effective recirculation of the cooling oil when the brake unit is operated with a vertical axis.

SUMMARY OF THE INVENTION

The present invention is directed to an improved liquid cooled brake unit which is ideally suited for electrical actuation and which may be installed where a source of compressed air is not available. The brake unit of the invention provides all of the desirable features mentioned above and, in addition, provides for an extra surge of cooling oil between the brake plates and discs when the braking operation is being applied for quickly dissipating the added heat from the brake plates and discs. The liquid cooled brake unit of the invention also automatically compensates for any wear of the brake plates and/or discs after an extended period of use and may be conveniently assembled and disassembled without special tools. The brake unit also provides for a manual release and for automatically resetting the brake unit when it is electrically actuated. The brake unit of the invention further provides for effective recirculation of the cooling oil not only when operating with a horizontal axis but also when operating with a vertical axis.

The above features and advantages are generally provided by a brake unit which incorporates, in accordance with a preferred embodiment, a housing formed by a cast base section coupled directly to a cast closure section and surrounding a tubular hub member rotatable within seals supported by the housing. The hub member is adapted to receive a shaft projecting from an electric motor or other drive on which the brake housing is mounted. The base section of the housing forms a sub-assembly which includes an annular thrust plate supporting a set of circumferentially spaced retainers for receiving compression springs extending from the base section. The thrust plate has clearance openings for receiving screws which attach the sub-assembly to the motor or drive housing, and cylindrical pins project inwardly from the base section to support a set of annular brake plates which interfits between a set of brake discs mounted on an annular hub portion defining oil inlet passages.

The closure section of the brake unit forms another sub-assembly which includes an annular armature plate, an annular coil and coil body, an annular pressure plate and a set of circumferentially spaced actuating pins which extend axially between the armature plate and the thrust plate through the coil body and pressure plate. The armature plate cooperates with the closure section to define an oil surge passage extending from a closable passage, and a pair of diametrically opposed and manually rotatable brake release members also form part of the sub-assembly for the closure section.

Other features and advantages of the invention will be apparent from the following description, the accompanying drawings and the appended claims.

BRIEF DESCRIPTION OF THE DRAWINGS

FIG. 1 is an axial section of an electrically actuated liquid cooled brake unit constructed in accordance with the invention and taken generally on the line 1—1 of FIG. 2;

FIG. 2 is a reduced end view of the brake unit as taken generally on the line 2—2 of FIG. 1;

FIG. 3 is a section taken generally on the line 3—3 of FIG. 1;

FIG. 4 is a section taken generally on the line 4—4 of FIG. 1;

FIGS. 5 and 6 are enlarged fragmentary sections taken generally on the line 5—5 of FIG. 4; and FIGS. 7 and 8 are sections taken generally on the corresponding lines 7—7 and 8—8 of FIG. 1.

DESCRIPTION OF THE PREFERRED EMBODIMENT

A liquid cooled brake unit or assembly 10 constructed in accordance with the invention includes a two-piece aluminum housing 12 formed by an annular base section 14 and a cup-shaped annular closure section 16 secured together by a set of screws 17 (FIG. 3). The base section 14 has a circular recess 18 and is adapted to mount on a standard C-face end bracket of an electric motor (not shown) where the section 14 is secured by a set of four cap screws 19. The housing 12 surrounds a tubular hub member 22 which has a step counterbore 23 and an internally splined surface 24 for receiving a mating externally splined surface on a shaft (not shown) projecting from the electric motor or gear box or other drive unit. A set of annular fluid seals 27 and 28 are retained by the housing sections 14 and 16, respectively, and engage corresponding hardened wear sleeves 29 pressed onto the corresponding end portions of the hub member 22.

The hub member 22 includes an integrally formed annular portion 32 which defines an annular coolant inlet passage 34, and a series of circumferentially spaced radial passages 36 extend from the inlet passage 34 to the externally splined outer surface 38 on the hub portion 32. A series of annular brake discs 40 are mounted on the splined outer surface 38 of the hub inlet portion 32 so that the discs rotate with the hub member 22 but are free to move axially on the surface 38. A series of annular brake plates 42 interfit between the brake discs 40 and are supported by a pair of diametrically opposed studs or pins 44 which project inwardly from bosses 46 formed as part of the housing section 12. A set of spring washers 47 (FIG. 1) are mounted on each pin 44 between the brake plates 42.

An annular thrust member or plate 48 (FIGS. 1 and 3) is positioned between the brake plates 42 and the base housing section 12 and has clearance holes 51 for the bosses 46. The thrust plate 48 is free to move axially by a small distance, but is attached to the housing section 14 by a pair of cap screws 53 (FIGS. 3 and 7) threaded into bosses 54 (FIG. 3) formed as part of the base section 14. The thrust plate 48 also has a set of four clearance holes 57 (FIG. 3) which receive the head portions of the mounting screws 19, and a series of eight hat-shaped metal retaining brackets 59 projected through corresponding rectangular openings 61 within the thrust plate 48.

A corresponding set of eight compression springs 64 (FIGS. 1 and 3) extend from the base section 14 into the corresponding brackets 59 for urging the thrust plate 48 to the right (FIG. 1) toward the head portions of the cap screws 53. Each of the springs 64 surrounds a corresponding alignment pin 66 projecting inwardly from the base section 14. The thrust plate 48, retaining brackets 59 and springs 64 are assembled within the housing section 14 as a sub-assembly with the springs 64 partially compressed and the thrust plate 48 retained by the screws 53.

Another sub-assembly is formed by the components within the closure section 16 of the housing 12. These components include an annular armature member or plate 70 which is slidably supported for slight axial movement by a set of spacer bushings 71 (FIGS. 1 and 4). The bushings 71 are mounted on corresponding retaining screws 72 threaded into bosses 73 formed as part of the end wall of the closure section 16. A cylindrical sleeve 74 is pressed into the inner surface of the armature plate 70 and projects into the inner bore of an annular coil body or housing 75 which is spaced from the housing section 16 by the bushings 71 and is secured to the housing by the screws 72. The coil housing 75 defines an annular cavity which receives a wound copper wire coil 78. Preferably, the coil 78 is adapted to receive a power supply of three phase 460 volt AC. A full wave diode bridge circuit (not shown) converts the AC power to DC power for operating the electric coil 78.

The coil housing 75 forms a flux path which is continued by the armature plate 70, and a thin sheet 81 of brass or non-magnetic material encloses the coil 78. The sheet 81 is secured to the coil housing 75 by circumferentially spaced screws 83 (FIG. 1) having head portions projecting into correspondence clearance holes or recesses within the armature plate 70. As shown in FIG. 1, the inner bore of the coil housing 75 cooperates with the outer surface of the hub member 22 to define an annular passage 86 forming a continuation of the inlet passage 34 within the hub member 22.

Referring to FIGS. 5 and 6, the armature plate 70 has an outer cylindrical surface 88 which cooperates with a surrounding cylindrical bore 91 forming a step within the housing section 16 to define an annular coolant recirculating passage 92 which extends from a sump chamber 94 within the lower portion of the housing section 16. The closure section 16 of the housing 12 also defines an oil recirculating passage or chamber 96 which projects into the end wall of the housing section 16 around the bosses 73 which receive the screws 72. A slightly deeper coolant recirculating channel or passage 99 (FIG. 4) is formed within the lower half of the housing section 16 and extends from the annular passage 92 to the annular passage 86, as shown in FIGS. 1 and 4.

An annular pressure member or plate 104 (FIGS. 1 and 8) is secured to the coil housing 75 by a set of four circumferentially spaced screws 106, and the outer surface of the pressure plate 104 is spaced inwardly from the housing section 16 to define an annular oil or coolant recirculating passage 108 therebetween. The pressure plate 104 has clearance holes 110 (FIG. 8) which align with the screws 72 and permit removing of the screws 72 while the pressure plate 104 is secured to the coil housing 75. As also shown in FIG. 8, the pressure plate 104 has an upper portion with a pair of arcuate openings or holes 112 and a pair of diametrically opposed notches 114. The lower portion of the coil housing 75 has a pair of circumferentially spaced recesses 116 (FIGS. 1 and 8) which extend radially outwardly from the annular passage 86 for a purpose which will be explained later.

A set of four actuating pins 120 (FIGS. 1 and 8) extend between the armature plate 70 and the thrust plate 48 through corresponding clearance holes within the pressure plate 104 and are supported for axial sliding movement by bushings 122 (FIG. 1) retained within corresponding bores in the coil housing 75. The coil housing 75 also retains a pair of diametrically opposed compression springs 126 (FIG. 1) which engage corresponding buttons 127 in contact with the armature plate 70. The springs 126 urge the armature plate 70 to the right (FIG. 1) when the coil 78 is de-energized. The springs 64 urged the thrust plate 48 towards the pressure plate 104 to clamp the brake discs 40 between the brake plates 42 for braking the rotation of the shaft and hub member 22 when the coil 78 is de-energized. The length of the actuating pins 120 are selected with sufficient clearance so that the thrust plate 48 will clamp the brake plates and discs against the pressure plate 104 even after the brake plates and discs become worn over an extended period of use. As apparent from FIG. 1, when the coil 78 is energized by electrical power supplied through a power line 125, the armature plate 70 is attracted to the coil housing 75. When the armature plate 70 shifts to the left (FIG. 1), the actuating pins 120 and the thrust plate 48 also move to the left so that the clamping pressure on the stack of brake discs and plates is released, and the brake discs 40 are free to rotate with the hub member 22. Thus the brake unit 10 is actuated when the coil 78 is de-energized, and the brake is released when the coil 78 is energized.

Referring to FIGS. 1 and 7, the brake unit 10 may be manually released when the electrical power is not being supplied to the coil 78. To obtain such release, a wrench is used to rotate a pair of hex heads 128 on a pair of radially projecting stub shafts 130. The shafts 130 are supported within corresponding tubular bushings 132 (FIG. 1) retained within a pair of bosses 134 of the housing section 16 by corresponding set screws 137. As shown in FIG. 1, a preloaded torsion spring 139 connects each of the shafts 130 to the corresponding bushing 132, and a set of resilient O-rings 142 form fluid-tight seals between each bushing 132 and the housing 16 and also between the shaft 130 and the corresponding bushing 132.

As shown in FIG. 7, a roller 144 and a cam plate 146 are mounted on each shaft 130 by a shouldered screw 148, and the roller 144 and cam plate 146 are offset or eccentric to the axis of the shaft 130. When the shafts 130 are rotated against the torque provided by the springs 139 by about 180 degrees, the rollers 144 engage the peripheral portion of the thrust plate 48 and shift the thrust plate to the left (FIG. 1) to release the clamping pressure exerted against the brake plates and discs. The cam plate 146 on each shaft 130 has a step which engages the thrust plate to limit the rotation of the shaft 130 but permit the roller 140 to pass over center while in contact with the thrust plate 48. The manual release of the thrust plate 48 will continue until either the coil 70 is energized or each shaft 130 is manually rotated back over-center in the opposite direction.

Referring to FIGS. 1 and 8, a predetermined supply of oil is added to the housing 12 after removing a breather cap 154 (FIG. 8), and preferably, the non-operating or static oil level is up to a sight glass 152 (FIG. 8) or the horizontal center plane of the brake unit. An air breather cap 154 (FIG. 1) permits air to flow into and out of the housing 12, and a drain plug 156 (FIG. 8) permits drainage of the oil from the housing 12. Another plug 158 (FIG. 1) may be removed to add a sight glass tube to the brake unit when it is desired for indicating the level of oil within the housing 12.

During normal operation of the brake unit described above, the coil 78 is energized when the electric motor is running so that the motor shaft and the hub member 22 are rotating. When it is desired to decelerate or brake the rotation of the shaft and hub member, the coil 78 is de-energized so that the armature plate 70 and the thrust plate 48 move to the right (FIG. 1) as a unit. This causes the rotating brake discs 40 to be clamped between the non-rotating brake plates 42 due to the pressure exerted by the springs 64 against the thrust plate 48 and towards the pressure plate 104. While the hub member 22 is rotating with the shaft and the coil 78 is energized, the oil within the housing 12 recirculates due to the centrifugal pumping action produced by rotation of the hub portion 32 and the brake discs 40. The oil flows outwardly through the passage 34 and 36 and between the brake plates and discs and then flows downwardly to the sump chamber 94. The oil is cooled by the housing 12, especially as the oil flows through the passages 92, 96 and 99 to the annular passage 86 defined between the hub member 22 and the coil housing 75. The cooled oil flows through the annular passage 86 and into the annular inlet passage 34 to complete the recirculation.

When the coil 78 is de-energized and the armature plate 70 moves to the right under the pressure exerted by the springs 64 and 126, as mentioned above, the armature plate 70 displaces oil within the chambers 96 and 99 and provides a surge of oil through the passages 86, 34 and 36 and between the brake discs and plates. This surge of oil provides additional cooling of the brake plates and discs when maximum heat is being generated during the braking operation. When the armature plate 70 moves to the right (FIG. 6), the passage 92 is restricted by the step 91 so that the surge of oil flows radially inwardly into the passage 34 and not outwardly through the passage 92.

From the drawings and the above description, it is apparent that a brake unit constructed in accordance with the present invention, provides desirable features and advantages. For example, the armature member or plate 70 also functions as a hydraulic piston when the coil 78 is de-energized so that an extra charge or surge of oil cooled by the housing 12 flows through the passages 34 and 36 and between the brake plates and discs when maximum cooling is desired during the braking operation. As another feature, the arrangement and assembly of the armature plate 70, coil housing 75, thrust plate 48, pressure plate 104, actuating rods or pins 120 and the stack of brake plates and discs, provides for an axially compact brake unit which automatically compensates for any wear of the brake plates and discs. This eliminates the need for periodically opening the brake unit and inserting shims after the brake discs and plates have become thinner over an extended period of use. As mentioned above, the brake unit also provides for two separate sub-assemblies, one with respect to each of the housing sections 14 and 16. This simplifies assembly of the brake unit during manufacture, simplifies installation of the unit onto an electric motor or other drive and simplifies disassembly of the brake unit for servicing.

While the brake unit described above in connection with FIGS. 1–8 is primarily intended for use for braking a shaft having a horizontal axis, the brake unit may also be used for braking a shaft having a vertical axis. When the brake unit is used with a vertical shaft, the pressure plate 104 (FIG. 8) is rotated 180 degrees so that the openings 112 align with the outer portions of the recesses 116. This permits some of the oil which flows outwardly between the brake discs and plates to recirculate directly back into the annular inlet passage 34 of the hub member 22 to assure a continued supply of oil between the brake plates and discs. Another important feature is provided by the manual release of the brake units when the coil 78 is de-energized by simply rotating the screws 128 (FIG. 7) so that the rollers 144 release the pressure exerted by the thrust plate 48 against the innerfitting brake discs and plates. When the coil 78 is then energized, the manual release shafts 130 automatically reset in response to the torsion springs 139 to position the rollers 144 in their inactive normal positions. The notches 114 (FIG. 8) provide for assembling and disassembling the pressure plate 104 and coil body 75 as a unit into the housing section 16 after the manual release units are assembled into the housing section. The plate 104 and coil body 75 are inserted into the housing section and then rotated.

While the form of brake apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for braking the rotation of a shaft, comprising a hub member having a center axis and means defining a liquid coolant inlet passage, means for connecting said hub member to the shaft for rotation therewith, at least one annular brake disc mounted on said hub member for rotation therewith, means connecting said inlet passage to the inner portion of said brake disc, a housing surrounding said hub member and including an annular base section coupled to a closure section for enclosing, a liquid coolant, at least one non-rotatable annular brake plate disposed adjacent said brake disc and connected to said housing, said coolant flowing outwardly through said inlet passage within said hub member and between said brake disc and plate in response to rotation of said hub member and said brake disc, means defining a recirculating passage within said housing for recirculating said coolant from said brake plate and disc into said inlet passage of said hub member, a non-rotatable annular thrust member and a non-rotatable annular pressure member supported by said housing with said brake plate and disc disposed therebetween, an annular non-rotatable electrical coil and an annular armature member disposed within said housing, an annular coil body secured within said housing and supporting said coil, means for moving said thrust member between a brake release position and a brake engaged position clamping said brake disc and plate together in response to energizing said coil and axial movement of said armature member, means defining a coolant surge passage connecting said recirculating passage to said inlet passage, and means for displacing oil within said surge passage inwardly into said inlet passage in response to movement of said armature member for producing a surge of coolant between said brake plate and disc when said thrust member moves towards said brake engaged position.

2. Apparatus as defined in claim 1 wherein said coil and said armature member are disposed within said housing concentric with said hub member, said housing defining a lower sump chamber, and said surge passage extends adjacent said housing and connects said sump chamber to said inlet passage.

3. Apparatus as defined in claim 2 wherein said closure section of said housing includes said means defining said surge passage.

4. Apparatus as defined in claim 1 wherein said thrust member comprises a thrust plate disposed between said brake plate and said base section of said housing, and a plurality of circumferentially spaced brake actuating pins supported for axial movement and extending between said thrust plate and said armature member.

5. Apparatus as defined in claim 1 and including a plurality of circumferentially spaced and axially extending compression springs supported by said base section of said housing and disposed for urging said thrust member towards said pressure member, and means for securing said thrust member to said base section of said housing while permitting axial movement of said thrust member to form a sub-assembly within said base section.

6. Apparatus as defined in claim 1 wherein said coil body and said pressure member cooperate to define at least one coolant recirculating passage for connecting outer portions of said brake plate and disc directly to said inlet passage when said apparatus is positioned with said hub member having a vertical axis.

7. Apparatus as defined in claim 1 and including a plurality of circumferentially spaced and axially extending cylindrical support pins mounted on said base section of said housing, a plurality of said brake plates each having openings receiving said pins, a set of spring washers mounted on said support pins between said brake plates, and said thrust member is disposed between said brake plates and said base section of said housing.

8. Apparatus as defined in claim 1 wherein said annular coil body defines an annular chamber receiving said coil, and said armature member comprises an annular armature plate concentric with said hub member and disposed between said coil body and said closure section of said housing.

9. Apparatus as defined in claim 8 wherein said closure section of said housing has a generally radially extending end wall, and said end wall defines said surge passage opposing said armature plate.

10. Apparatus as defined in claim 9 wherein said thrust member comprises a thrust plate disposed between said brake plate and said base section of said housing, and a plurality of circumferentially spaced actuating rods extend axially from said armature plate to said thrust plate and past said pressure member.

11. Apparatus as defined in claim 1 and including a plurality of circumferentially spaced compression springs extending axially between said base section of said housing and into corresponding openings within said thrust member, and a corresponding plurality of retaining elements mounted on said thrust member and extending through said openings within said thrust member for retaining said compression springs.

12. Apparatus as defined in claim 11 and including means for releasably securing said thrust member to said base section of said housing while also providing for axial movement of said thrust member to facilitate assembly and disassembly of said apparatus.

13. Apparatus as defined in claim 1 wherein said armature member has a peripheral portion cooperating with said closure section of said housing to define an oil recirculating restriction passage, and said restriction passage varies in area when said armature member moves axially within said housing.

14. Apparatus as defined in claim 1 and including release means supported by said housing for manually moving said thrust member towards said base section of said housing for releasing the clamping pressure exerted against said brake plate and disc by said thrust member.

15. Apparatus as defined in claim 14 wherein said release means comprise a set of peripherally spaced and manually rotatable shafts supported by said housing, and eccentric means mounted on said shafts within said housing for moving said thrust member axially in response to rotation of said shafts.

16. Apparatus as defined in claim 15 and including a tubular bushing supporting each said shaft for rotation, means including a torsion spring connecting each said shaft to said bushing, and means for releasably retaining each said shaft in a brake released position against the torque exerted by said torsion spring.

17. Apparatus for braking the rotation of a shaft, comprising a hub member having a center axis and means defining a liquid coolant inlet passage, means for connecting said hub member to the shaft for rotation therewith, a plurality of annular brake discs mounted on said hub member for rotation therewith, means connecting said inlet passage to the inner portions of said brake discs, a housing surrounding said hub member and including an annular base section coupled to a closure section for enclosing a liquid coolant, a plurality of non-rotatable annular brake plates disposed between said brake discs and connected to said housing, said coolant flowing outwardly through said inlet passage and between said brake discs and plates in response to rotation of said hub member and said brake discs, means defining a recirculating passage within said housing for recirculating said coolant from said brake plates and discs into said inlet passage of said hub member, a non-rotatable annular thrust plate and a non-rotatable annular pressure plate supported by said housing with said brake plates and discs disposed therebetween, an annular electrical coil and coil body supported within said housing concentric with said hub member and disposed between said pressure plate and said closure section of said housing, an annular armature plate supported within said housing concentric with said hub member and disposed between said coil body and said closure section of said housing, actuating means extending axially between said thrust and armature plates past said coil and said pressure plate, and spring means cooperating with said actuating means for moving said thrust plate between a brake release position and a brake engaged position clamping said brake discs and plates against said thrust plate in response to energizing said coil and axial movement of said armature plate.

18. Apparatus as defined in claim 17 wherein said closure section of said housing defines a coolant surge passage connecting said recirculating passage to said inlet passage, and means for displacing oil within said surge passage inwardly into said inlet passage in response to movement of said armature plate for producing a surge of coolant between said brake plates and discs when said thrust plate moves towards said brake engaged position.

19. Apparatus as defined in claim 17 wherein said actuating means comprise a plurality of circumferentially spaced elongated brake actuating rods supported for corresponding axial movement by said coil body.

20. Apparatus as defined in claim 17 wherein said spring means include a plurality of circumferentially spaced and axially extending compression springs supported by said base section of said housing and disposed for urging said thrust plate towards said pressure plate, and means for securing said thrust plate to said base section of said housing while permitting axial movement of said thrust plate to form a sub-assembly within said base section.

21. Apparatus as defined in claim 17 wherein said coil body and said pressure plate cooperate to define at least one coolant recirculating passage for connecting outer portions of said brake plates and discs directly to said inlet passage when said apparatus is positioned with said hub member having a vertical axis.

22. Apparatus as defined in claim 17 and including a plurality of circumferentially spaced compression springs extending axially between said base section of said housing and into corresponding openings within said thrust plate, and a corresponding plurality of generally U-shaped brackets mounted on said thrust plate and extending through said openings within said thrust plate for retaining said compression springs.

23. Apparatus as defined in claim 17 wherein said armature plate has a peripheral portion cooperating with said closure section of said housing to define an oil recirculating restriction passage, and said restriction passage varies in area when said armature plate moves axially within said housing.

24. Apparatus as defined in claim 17 and including release means supported by said housing for manually moving said thrust plate towards said base section of said housing for releasing the clamping pressure exerted against said brake plates and discs by said thrust plate.

25. Apparatus as defined in claim 24 wherein said release means comprise a set of peripherally spaced and manually rotatable shafts supported by said housing, and eccentric means mounted on said shafts within said housing for moving said thrust plate axially in response to rotation of said shafts.

26. Apparatus as defined in claim 25 and including a tubular bushing supporting each shaft for rotation, means including a torsion spring connecting each shaft to said bushing, and means for releasably retaining each said shaft in a brake released position against the torque exerted by said torsion spring.

27. Apparatus for braking the rotation of a shaft, comprising a hub member having a center axis and means defining a liquid coolant inlet passage, means for connecting said hub member to the shaft for rotation therewith, at lease one annular brake disc mounted on said hub member for rotation therewith, means connecting said inlet passage to the inner portion of said brake disc, a housing surrounding said hub member and including an annular base section coupled to a closure section for enclosing a liquid coolant, at lease one non-rotatable annular brake plate disposed adjacent said brake disc and connected to said housing, said coolant flowing outwardly through said inlet passage within said hub member and between said brake disc and plate in response to rotation of said hub member and said brake disc, means defining a recirculating passage within said housing for recirculating said coolant from said brake plate and disc into said inlet passage of said hub member, a non-rotatable annular thrust member and a non-rotatable annular pressure member supported by said housing with said brake plate and disc disposed therebetween, an annular non-rotatable electrical coil and an annular armature member disposed within said housing, an annular coil body secured within said housing and supporting said coil, means for moving said thrust member between a brake release position and a brake engage position clamping said brake disc and plate together in response to energizing said coil and axial movement of said armature member, a set of peripherally spaced and manually rotatable shafts supported by said housing, and eccentric means mounted on said shafts within said housing for moving said thrust member axially in response to rotation of said shafts for manually releasing the clamping pressure exerted against said brake plate and disc by said thrust member.

28. Apparatus as defined in claim 27 and including a tubular bushing supporting each said shaft for rotation, means including a torsion spring connecting and each said shaft to said bushing, and means for releasably retaining each said shaft in a brake released position against the torque exerted by said torsion spring.

29. Apparatus for braking the rotation of a shaft, comprising a tubular hub member adapted to receive the shaft and having a center axis and means defining a liquid coolant inlet passage, means for connecting said hub member to the shaft for rotation therewith, a plurality of annular brake discs mounted on said hub member for rotation therewith, means connecting said inlet passage to the inner portions of said brake discs, a housing surrounding said hub member and including an annular base section coupled to a closure section having an end wall disposed perpendicular to the axis, seal means between said hub member and said housing for enclosing a coolant within said housing, a plurality of non-rotatable annular brake plates disposed between said brake discs and connected to said housing, said coolant flowing outwardly through said inlet passage and between said brake discs and plates in response to rotation of said hub member and said brake discs, means defining a recirculating passage within said housing for recirculating said coolant from said brake plates and discs along said housing and into said inlet passage of said hub member, a non-rotatable annular thrust plate disposed between said brake plates and said base section of said housing, a non-rotatable annular pressure plate supported by said closure section of said housing and disposed adjacent said brake plates, an annular electrical coil, an annular coil body supported within said closure section of said housing concentric with said hub member and disposed between said pressure plate and said end wall of said closure section, an annular armature plate supported within said housing concentric with said hub member and disposed between said coil body and said end wall of said closure section, a plurality of actuating rods extending axially between said thrust and armature plates past said coil and said pressure plate, and a plurality of springs extending between said thrust plate and said closure section of said housing and cooperating with said actuating rods for moving said thrust plate between a brake release position and a brake engaged position clamping said brake discs and plates against said thrust plate in response to energizing said coil and axial movement of said armature plate.

30. Apparatus as defined in claim 29 wherein said end wall of said closure section defines a coolant surge passage connecting said recirculating passage to said inlet passage, and means for displacing oil within said surge passage radially inwardly into said inlet passage in response to movement of said armature plate towards said end wall for producing a surge of coolant between said brake plates and discs when said thrust plate moves towards said brake engaged position.

* * * * *